(12) United States Patent
Capelot et al.

(10) Patent No.: US 10,961,348 B2
(45) Date of Patent: *Mar. 30, 2021

(54) SEMI-CRYSTALLINE POLYAMIDE COMPOSITION WITH HIGH GLASS TRANSITION TEMPERATURE FOR COMPOSITE MATERIAL, PROCESS FOR MANUFACTURING SAME AND USES THEREOF

(71) Applicant: Arkema France, Colombes (FR)

(72) Inventors: Mathieu Capelot, Bernay (FR); Gilles Hochstetter, L'Hay les Roses (FR)

(73) Assignee: Arkema France, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,438

(22) Filed: Jul. 16, 2019

(65) Prior Publication Data

US 2019/0338074 A1 Nov. 7, 2019

Related U.S. Application Data

(63) Continuation of application No. 15/758,923, filed as application No. PCT/FR2017/051873 on Jul. 10, 2017, now Pat. No. 10,377,856.

(30) Foreign Application Priority Data

Jul. 11, 2016 (FR) ...................... 16.56626

(51) Int. Cl.
| | |
|---|---|
| *C08K 7/14* | (2006.01) |
| *C08L 77/06* | (2006.01) |
| *C08K 7/02* | (2006.01) |
| *C08G 69/36* | (2006.01) |
| *C08G 69/26* | (2006.01) |
| *C08G 69/28* | (2006.01) |
| *C08J 5/24* | (2006.01) |
| *B29C 67/24* | (2006.01) |
| *B29K 77/00* | (2006.01) |

(52) U.S. Cl.
CPC ........... *C08G 69/36* (2013.01); *C08G 69/265* (2013.01); *C08G 69/28* (2013.01); *C08J 5/24* (2013.01); *C08K 7/02* (2013.01); *C08L 77/06* (2013.01); *B29C 67/246* (2013.01); *B29K 2077/00* (2013.01); *C08J 2377/06* (2013.01)

(58) Field of Classification Search
None
See application file for complete search history.

(56) References Cited

U.S. PATENT DOCUMENTS

| | | | |
|---|---|---|---|
| 3,875,120 A | 4/1975 | Brinkmann | C08G 69/265 |
| | | | 528/339 |
| 5,422,418 A | 6/1995 | Maj et al. | |
| 5,665,855 A | 9/1997 | Acevedo et al. | |
| 7,592,558 B2 | 9/2009 | Lima | C08K 3/26 |
| | | | 200/16 A |
| 7,892,455 B2* | 2/2011 | Bradley | C08L 69/00 |
| | | | 252/511 |
| 7,927,710 B2 | 4/2011 | Hewel | |
| 8,324,307 B2 | 12/2012 | Harder et al. | |
| 8,771,862 B2 | 7/2014 | Kim et al. | |
| 8,883,908 B2* | 11/2014 | Gleich | B29C 70/36 |
| | | | 524/494 |
| 9,752,029 B2 | 9/2017 | Briffaud | C08G 69/265 |
| 2002/0040087 A1 | 4/2002 | Yamamoto | C08G 69/26 |
| | | | 524/451 |
| 2009/0062452 A1 | 3/2009 | Harder | C08G 69/26 |
| | | | 524/494 |
| 2011/0306718 A1 | 12/2011 | Scherzer et al. | |
| 2012/0083558 A1 | 4/2012 | Bayer | C05K 5/098 |
| | | | 524/101 |

(Continued)

FOREIGN PATENT DOCUMENTS

| | | |
|---|---|---|
| CN | 104211953 A | 12/2014 |
| EP | 0550314 A1 | 7/1993 |

(Continued)

OTHER PUBLICATIONS

International Search Report and Written Opinion for International Application No. PCT/FR2017/051873, dated Oct. 19, 2017—10 Pages.

(Continued)

*Primary Examiner* — Tae H Yoon

(74) *Attorney, Agent, or Firm* — Thomas F. Roland

(57) ABSTRACT

The invention relates to a composition for thermoplastic composite material comprising:

30% to 60% by volume, preferentially 35% to 50% by volume, of a thermoplastic matrix comprising from 50% to 100% by weight of a semi-crystalline polyamide polymer and from 0% to 50% by weight of at least one additive and/or of at least one other polymer, 40% to 70% by volume, preferentially 50% to 65% by volume, of long reinforcing fibers (or of long fibrous reinforcement), said thermoplastic matrix impregnating said long reinforcing fibers (or said long fibrous reinforcement), said semi-crystalline polyamide polymer being a nonreactive composition of at least one polyamide polymer, said composition being that of said thermoplastic matrix defined above, and said reactive polyamide prepolymer of the composition a) and said polyamide polymer of the composition b) comprising or consisting of at least one BACT/XT copolyamide.

14 Claims, 1 Drawing Sheet

(56) References Cited

U.S. PATENT DOCUMENTS

| | | | |
|---|---|---|---|
| 2012/0095161 A1 | 4/2012 | Pawilk | C08G 69/265 524/607 |
| 2013/0049443 A1 | 2/2013 | Heb | B60B 5/02 301/64.703 |
| 2014/0127440 A1 | 5/2014 | Norfolk et al. | |
| 2015/0322622 A1 | 11/2015 | Gaillard et al. | |
| 2016/0295705 A1* | 10/2016 | Stoeppelmann | C08K 7/14 |
| 2016/0295706 A1 | 10/2016 | Jiang | F21K 9/272 |

FOREIGN PATENT DOCUMENTS

| | | |
|---|---|---|
| EP | 0581641 A1 | 2/1994 |
| EP | 0581642 A1 | 2/1994 |
| EP | 0739924 A1 | 10/1996 |
| EP | 1988113 A1 | 11/2008 |
| EP | 2028231 A1 | 2/2009 |
| JP | 2015017177 A | 1/2015 |
| WO | 2010130930 A1 | 11/2010 |
| WO | 2011003973 A2 | 1/2011 |
| WO | 2014064375 A1 | 5/2014 |
| WO | 2016102217 A1 | 6/2016 |
| WO | 2017098178 A1 | 6/2017 |
| WO | 2017098179 A1 | 6/2017 |

OTHER PUBLICATIONS

Postma et al., "A Simple Method for Determining Protic End-groups of Synthetic Polymers by 1H NMR Spectroscopy", Polymer, vol. 47, 2006, pp. 1899-1911.

* cited by examiner

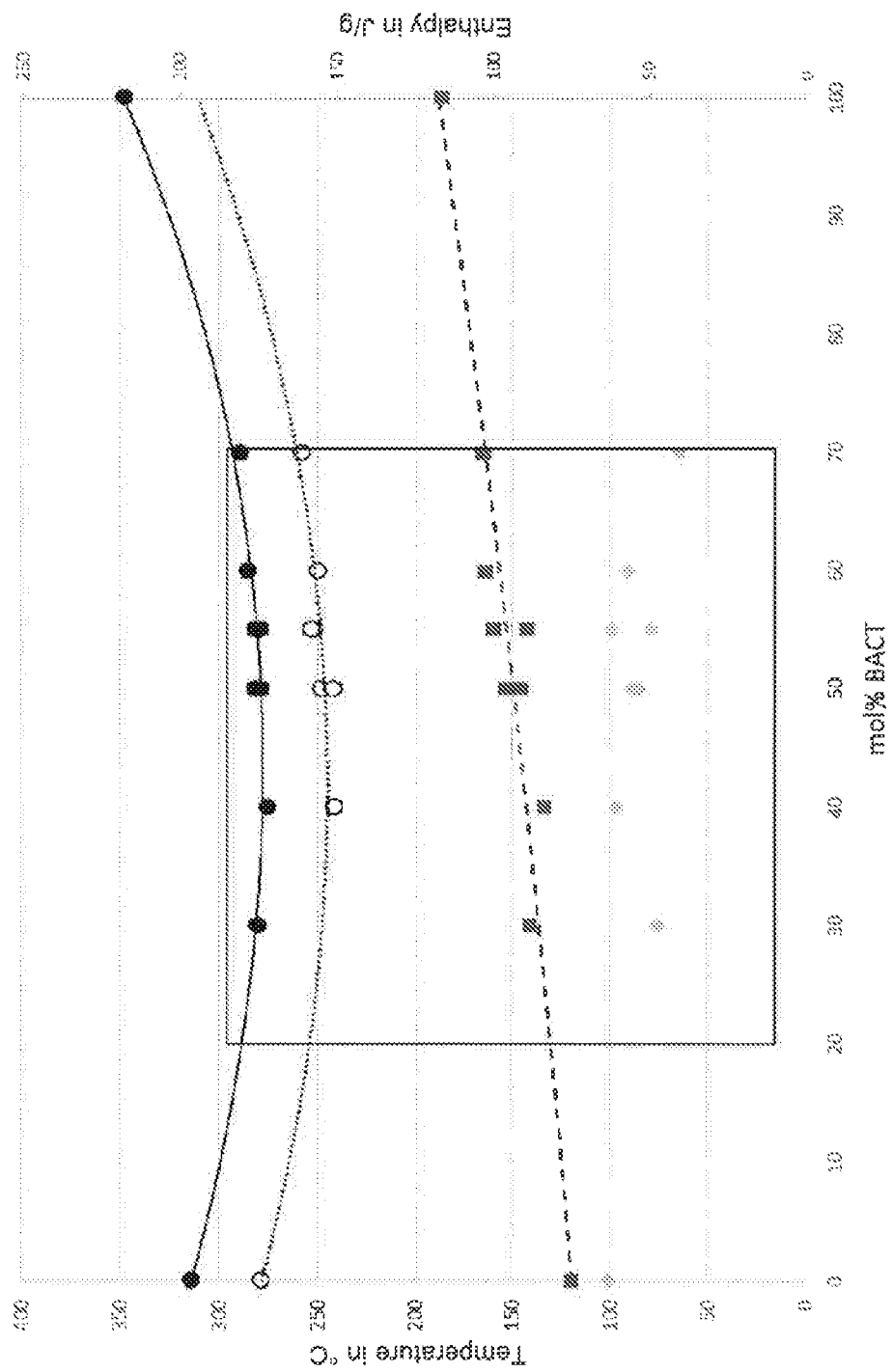

US 10,961,348 B2

SEMI-CRYSTALLINE POLYAMIDE COMPOSITION WITH HIGH GLASS TRANSITION TEMPERATURE FOR COMPOSITE MATERIAL, PROCESS FOR MANUFACTURING SAME AND USES THEREOF

This application in a Continuation Application of, and claims benefit to, copending application number U.S. Ser. No. 15/758,923, filed Mar. 9, 2018; granted as U.S. Pat. No. 10,377,856; which claimed benefit, under U.S.C. § 119 or § 365 of PCT Application Number PCT/FR2017/051873, filed Jul. 10, 2017, and French Patent Application Number FR 16.56626, filed Jul. 11, 2016. The disclosure of each of these applications is incorporated herein by reference in its entirety for all purposes.

FIELD OF THE INVENTION

The invention relates to a novel semi-crystalline (sc) polyamide composition having a high glass transition temperature, based on bis(aminomethyl)cyclohexane (BAC) and on long reinforcing fibers for thermoplastic composite material.

It also relates to a process for manufacturing said composite material and also the uses of said composition for manufacturing mechanical or structural parts based on said composite material for composite material parts and also the composite part which results therefrom and for applications in the motor vehicle, railway, marine, road transport, wind power, sport, aeronautical and aerospace, construction, panel and leisure fields.

BACKGROUND OF THE INVENTION

A major challenge in composite materials is to find a polyamide resin which meets the following specifications:
  High Tg for a wide range of operating temperatures;
  The lowest possible Mp, so as to be readily processable without recourse to excessively specific mold metallurgies;
  A very good crystallization capacity in order to be able to be rapidly demolded and thus to be compatible with intensive production cycles, such as those used in the motor vehicle industry;
  A high rigidity, including under hot conditions, so as to be able to obtain the highest possible moduli of the final material.

Document CN 104211953 describes a polyamide composition comprising from 30% to 99.9% by weight of a polyamide resin comprising from 60 to 95 mol % of 10T, from 5 to 40 mol % of 5'T, 5' corresponding to 2-methyl-1,5-pentamethylenediamine, from 0% to 70% by weight of a reinforcing filler and from 0.1% to 50% by weight of an additive.

The polyamide resin has a melting point above 260° C.

EP 550 314 describes, among its examples, (nonreactive) copolyamide compositions in a search for melting points of greater than 250° C. and limited Tg values, with the majority of the examples cited having an excessively low Tg (<80° C.) or an excessively high Mp (>300° C.).

EP 1 988 113 describes a molding composition based on a 10T/6T copolyamide with:
  40 to 95 mol % of 10T
  5 to 40% of 6T.

Polyamides with a high melting point of greater than 270° C. are targeted in particular. The examples mentioned and FIG. 1 teach that the melting point of these compositions is at least approximately 280° C.

WO 2011/003973 describes compositions comprising from 50 mol % to 95 mol % of a unit based on a linear aliphatic diamine comprising from 9 to 12 carbon atoms and on terephthalic acid and from 5% to 50% of unit combining terephthalic acid with a mixture of 2,2,4- and 2,4,4-trimethylhexanediamine.

US 2011/306718 describes a process for the pultrusion of reactive aliphatic polyamides having low Tg values in combination with chain extenders of polymeric structure bearing several (and many more than 2) anhydride or epoxide functions. This document does not describe any nonpolymeric extender.

WO 2014/064375 describes in particular a PA MXDT/10T which exhibits an excellent compromise between the various characteristics described above. Unfortunately, the m-xylene diamine (MXD) monomer used is highly subject to side-reactions, giving rise in particular to the formation of branching.

The drawbacks of the prior art, with the absence of a good compromise between the mechanical performance levels and the processing ability (ease of transformation) at lower temperature with a shorter production cycle time are overcome by means of the solution of the present invention which targets semi-crystalline PA compositions having an excellent compromise between high mechanical performance levels (mechanical strength), in particular under hot conditions, and easy processing. It in fact has a high rigidity and has a glass transition temperature >120° C., a Mp<290° C., and also an excellent crystallization capacity (Mp–Tc<40° C.), which makes it a matrix of choice for composite applications, in particular for the wind power, motor vehicle or aeronautical industry.

More particularly, in the case of the reactive compositions, it is sought to have faster reaction kinetics while at the same time having a rate and/or temperature of crystallization of the polymer formed that are also higher.

The choice of a semi-crystalline polyamide polymer, as matrix of the composite material of the invention, has the advantage, compared with amorphous polyamides, of significantly improved mechanical performance levels, especially at elevated temperature, such as creep resistance or fatigue resistance. In addition, having a melting point above 200° C. has the advantage in the motor vehicle industry of being compatible with treatments by cataphoresis, which a structure of amorphous PA type does not permit. As for the amorphous materials, a Tg of greater than or equal to 90° C. is sought so as to ensure good mechanical properties for the composite over the entire working temperature range, for example up to 90° C. for the wind power industry, up to 100° C. for the motor vehicle industry and up to 120° C. for the aeronautical industry. Conversely, an excessively high melting point, in particular of greater than 290° C., is on the other hand harmful as it requires processing the composite at higher temperatures with constraints in terms of molding equipment to be used (and associated heating system) and excessive consumption of energy with, in addition, risks of thermal degradation due to heating at temperatures higher than the melting point of said polyamide, with as a consequence the modification of the properties of the final thermoplastic matrix and of the composite which results therefrom. The crystallinity of said polymer must be as high as possible, but with a melting point Mp that is not too high (Mp<290° C. and more particularly <280° C.) in order to optimize the mechanical performance levels and the crystallization rate and/or the crystallization temperature must be as high as possible, in order to reduce the molding time before ejection of the molded composite part with a selective choice of the composition of said semi-crystalline polyamide.

SUMMARY OF THE INVENTION

The subject of the present invention is the processing of novel specific compositions of thermoplastic composite, in particular based on semi-crystalline polyamide, having a good compromise between high mechanical performance levels (mechanical strength), in particular hot mechanical performance levels, and easy processing. This means that the objective is compositions that are easy to process with transformation and processing temperatures that are lower than those for other compositions of the prior art, with a more favorable overall processing energy balance, a shorter cycle time and a higher productivity. More particularly, the solution of the invention, in the case of reactive compositions, allows, using compositions based on semi-crystalline reactive polyamide prepolymers, both fast reaction kinetics and fast crystallization kinetics with a shorter cycle time. More particularly, the polyamide polymer matrix, while having a high Tg and a limited Mp, as defined, with easy processing of said composite, must also have a high crystallization speed characterized first by a difference between melting point and crystallization temperature Mp-Tc not exceeding 40° C., preferably not exceeding 30° C. Consequently, the object of the invention is to develop a polyamide composition corresponding to the needs already defined above:

High Tg for a wide range of operating temperatures;

The lowest possible Mp, so as to be readily processable without recourse to excessively specific mold metallurgies;

A very good crystallization capacity in order to be able to be rapidly demolded and thus to be compatible with intensive production cycles, such as those used in the motor vehicle industry;

A high rigidity, including under hot conditions, so as to be able to obtain the highest possible moduli of the final material.

The present invention relates to a composition for thermoplastic composite material comprising:

30% to 60% by volume, preferentially 35% to 50% by volume, of a thermoplastic matrix comprising from 50% to 100% by weight of a semi-crystalline polyamide polymer and from 0% to 50% by weight of at least one additive and/or of at least one other polymer, 40% to 70% by volume, preferentially 50% to 65% by volume, of long reinforcing fibers (or of long fibrous reinforcement), said thermoplastic matrix impregnating said long reinforcing fibers (or said long fibrous reinforcement), said semi-crystalline polyamide polymer being:

a) a reactive composition comprising or consisting of at least one reactive polyamide prepolymer which is a precursor of said semi-crystalline polyamide polymer, or, as an alternative to a), b) a nonreactive composition of at least one polyamide polymer, said composition being that of said thermoplastic matrix defined above, and said reactive polyamide prepolymer of the composition a) and said polyamide polymer of the composition b) comprising or consisting of at least one BACT/XT copolyamide in which:

BACT is a unit comprising an amide unit present at a molar content ranging from 20% to 70%, preferably from 25% to 60%, more preferentially from 35% to 55%, wherein BAC is chosen from 1,3-bis(aminomethyl)cyclohexyl (1,3-BAC) and 1,4-bis(aminomethyl) cyclohexyl (1,4-BAC) and a mixture thereof, and T is terephthalic acid, XT is a unit comprising an amide unit present at a molar content ranging from 30% to 80%, preferably from 40% to 75%, more preferentially from 45% to 65%, wherein X is a C9 to C18, preferably C9, C10, C11 and C12, preferentially C10, C11 and C12, linear aliphatic diamine, and wherein T is terephthalic acid;

in the BACT and/or XT units, independently of one another, up to 30 mol %, preferably 20 mol %, in particular up to 10 mol %, relative to the total amount of dicarboxylic acids, of the terephthalic acid can be replaced with other aromatic, aliphatic or cycloaliphatic dicarboxylic acids comprising 6 to 36 carbon atoms, in particular 6 to 14 carbon atoms, and in the BACT and/or XT units, independently of one another, up to 30 mol %, preferably 20 mol %, in particular up to 10 mol %, of the BAC and/or where appropriate of X, relative to the total amount of diamines, can be replaced with other diamines comprising from 4 to 36 carbon atoms, in particular 6 to 12 carbon atoms, and in the copolyamide, no more than 30 mol %, preferably no more than 20 mol %, preferably no more than 10 mol %, relative to the total amount of monomers, can be formed by lactams or aminocarboxylic acids, and on condition that the sum of the monomers which replace the terephthalic acid, the BAC and X does not exceed a concentration of 30 mol %, preferably 20 mol %, preferably 10 mol %, relative to the total amount of monomers used in the copolyamide, and on condition that BACT and XT units are always present in said polyamide polymer. Said semi-crystalline polyamide polymer is consequently the semi-crystalline polyamide polymer which forms the basis of the thermoplastic matrix, said thermoplastic matrix possibly being obtained from the reactive composition a) which corresponds to:

either a polyamide prepolymer with a di-NH$_2$ or di-CO$_2$H end group which can react respectively with another polyamide prepolymer with a di-CO$_2$H or di-NH$_2$ end group to give said semi-crystalline polyamide polymer, or a prepolymer with an NH$_2$ and CO$_2$H end group which can react with itself, to give said semi-crystalline polyamide polymer, or a prepolymer which can react with a chain extender, to give said semi-crystalline polyamide polymer, or the semi-crystalline polyamide polymer is already present in the non-reactive composition b).

In other words, the present invention relates to a composition for thermoplastic composite material comprising:

30% to 60% by volume, preferentially 35% to 50% by volume, of a thermoplastic matrix comprising from 50% to 100% by weight of a semi-crystalline polyamide polymer and from 0% to 50% by weight of at least one additive and/or of at least one other polymer, 40% to 70% by volume, preferentially 50% to 65% by volume, of long reinforcing fibers (or of long fibrous reinforcement), said thermoplastic matrix impregnating said long reinforcing fibers (or said long fibrous reinforcement), said thermoplastic matrix being:
a) a reactive composition comprising or consisting of at least one reactive polyamide prepolymer which is a precursor of said semi-crystalline polyamide polymer, or, as an alternative to a),
b) a nonreactive composition of at least one polyamide polymer, said composition being that of said thermoplastic matrix defined above, and said reactive polyamide prepolymer of the composition a) and said polyamide polymer of the composition b) comprising or consisting of at least one BACT/XT copolyamide in which:

BACT is a unit comprising an amide unit present at a molar content ranging from 20% to 70%, preferably from 25% to 60%, more preferentially from 35% to 55%, wherein BAC is chosen from 1,3-bis(aminomethyl)cyclohexyl (1,3-BAC) and 1,4-bis(aminomethyl)cyclohexyl (1,4-BAC) and a mixture thereof, and T is terephthalic acid, XT is a unit comprising an amide unit present at a molar content ranging from 30% to 80%, preferably from 40% to 75%, more preferentially from 45% to 65%, wherein X is a C9 to $C_{18}$, preferably C9, $C_{10}$, $C_{11}$ and $C_{12}$, preferentially $C_{10}$, $C_{11}$ and $C_{12}$, linear aliphatic diamine, and wherein T is terephthalic acid;

in the BACT and/or XT units, independently of one another, up to 30 mol %, preferably 20 mol %, in particular up to 10 mol %, relative to the total amount of dicarboxylic acids, of the terephthalic acid can be replaced with other aromatic, aliphatic or cycloaliphatic dicarboxylic acids comprising 6 to 36 carbon atoms, in particular 6 to 14 carbon atoms, and in the BACT and/or XT units, independently of one another, up to 30 mol %, preferably 20 mol %, in particular up to 10 mol %, of the BAC and/or where appropriate of X, relative to the total amount of diamines, can be replaced with other diamines comprising from 4 to 36 carbon atoms, in particular 6 to 12 carbon atoms, and in the copolyamide, no more than 30 mol %, preferably no more than 10 mol %, relative to the total amount of monomers, can be formed by lactams or aminocarboxylic acids, and on condition that the sum of the monomers which replace the terephthalic acid, the BAC and X does not exceed a concentration of 30 mol %, preferably 10 mol %, relative to the total amount of monomers used in the copolyamide, and on condition that BACT and XT units are always present in said polyamide polymer.

DETAILED DESCRIPTION OF THE INVENTION

The expression "said reactive polyamide prepolymer of the composition a) and said polyamide polymer of the composition b) comprising or consisting of at least one BACT/XT co-polyamide" signifies that the reactive polyamide prepolymer of the composition a) or said polyamide polymer of the composition b) consist exclusively of units comprising BACT and XT amide units in respective proportions defined above, or the reactive polyamide prepolymer of the composition a) or said polyamide polymer of the composition b) comprise BACT and XT amide units in respective proportions defined above, but also other units comprising amide units.

Advantageously, the proportion of units comprising amide units the proportion of BACT/XT, BACT and XT in the reactive polyamide prepolymer of the composition a) or said polyamide polymer of the composition b) is greater than 50%, in particular greater than 60%, in particular greater than 70%, preferentially greater than 80%, in particular greater than 90%.

The present invention therefore relates to a composition for thermoplastic composite material comprising:

30% to 60% by volume, preferentially 35% to 50% by volume, of a thermoplastic matrix comprising from 50% to 100% by weight of a semi-crystalline polyamide polymer and from 0% to 50% by weight of at least one additive and/or of at least one other polymer, 40% to 70% by volume, preferentially 50% to 65% by volume, of long reinforcing fibers (or of long fibrous reinforcement), said thermoplastic matrix impregnating said long reinforcing fibers (or said long fibrous reinforcement), said semi-crystalline polyamide polymer comprising or consisting of at least one BACT/XT copolyamide in which:

BACT is a unit comprising an amide unit present at a molar content ranging from 20% to 70%, preferably from 25% to 60%, more preferentially from 35% to 55%, wherein BAC is chosen from 1,3-bis(aminomethyl)cyclohexyl (1,3-BAC) and 1,4-bis(aminomethyl)cyclohexyl (1,4-BAC) and a mixture thereof, and T is terephthalic acid, XT is a unit comprising an amide unit present at a molar content ranging from 30% to 80%, preferably from 40% to 75%, more preferentially from 45% to 65%, wherein X is a $C_9$ to $C_{18}$, preferably C9, $C_{10}$, $C_{11}$ and $C_{12}$, preferentially $C_{10}$, $C_{11}$ and $C_{12}$, linear aliphatic diamine, and wherein T is terephthalic acid;

in the BACT and/or XT units, independently of one another, up to 30 mol %, preferably 20 mol %, in particular up to 10 mol %, relative to the total amount of dicarboxylic acids, of the terephthalic acid can be replaced with other aromatic, aliphatic or cycloaliphatic dicarboxylic acids comprising 6 to 36 carbon atoms, in particular 6 to 14 carbon atoms, and in the BACT and/or XT units, independently of one another, up to 30 mol %, preferably 20 mol %, in particular up to 10 mol %, of the BAC and/or where appropriate of X, relative to the total amount of diamines, can be replaced with other diamines comprising from 4 to 36 carbon atoms, in particular 6 to 12 carbon atoms, and in the copolyamide, no more than 30 mol %, preferably no more than 10 mol %, relative to the total amount of monomers, can be formed by lactams or aminocarboxylic acids, and on condition that the sum of the monomers which replace the terephthalic acid, the BAC and X does not exceed a concentration of 30 mol %, preferably 10 mol %, relative to the total amount of monomers used in the copolyamide, and on condition that BACT and XT units are always present in said polyamide polymer.

Said composition is more particularly a composition for thermoplastic composite material. This means that it makes it possible to obtain a thermoplastic composite material.

Regarding the additives, without being limited thereto, the composition according to one preferred variant of the invention comprises more particularly specific additives that can absorb at the wavelength of a laser, for instance a UV or IR laser, this enabling the use of automated fiber placement (AFP) technology, in the case where the latter uses a laser heating mode, for welding the composite strips to one another, this being in particular in the case of composite strips based on glass fibers or on carbon fibers. Other additives, such as heat stabilizers, can be added to the precursor composition and therefore be present in the final thermoplastic composite material as used in the final application parts, in particular these stabilizers being antioxidants, against thermal oxidation and/or photo-oxidation of the polymer of the thermoplastic matrix. Said antioxidants are of sterically hindered phenolic type and/or sterically hindered amine type (commonly known as HALS). As suitable example of such additives, mention may be made of: carbon black (CB) in the form of CB powder or preferably in the form of masterbatches based on CB and on polyethylene (PE), or CB and polyamide (PA), $TiO_2$ (titanium oxide), ZnO (zinc oxide) and, in the case of an IR laser, indium tin oxide (sold by Evonik) and the heat stabilizers as mentioned above. As example of a CB+PE masterbatch with approximately 40% of CB, mention may be made of EUTHYLEN® sold by BASF. As example of a CB+PE masterbatch with approximately 15% of CB, mention may be made of RENOL® BLACK sold by CLARIANCE.

The additives can also be fillers which, in addition to the long reinforcing fibers, can in particular be any filler known to those skilled in the art in the composite field. They may in particular be heat-conducting and/or electrically conductive fillers, such as metal powder, pulverulent carbon black, carbon fibrils, carbon nanotubes (CNTs), silicon carbide, boron carbonitride, boron nitride or silicone nitride. In this respect, reference may be made to application WO 2010/130930 by the applicant.

It is clearly obvious that the long reinforcing fibers (or long fibrous reinforcements) are excluded from the additives.

The additives may also be flame retardants, such as a metal salt chosen from a metal salt of phosphinic acid, a metal salt of diphosphinic acid, a polymer containing at least one metal salt of phosphinic acid, and a polymer containing at least one metal salt of diphosphinic acid.

The expression "other polymers" denotes any thermoplastic polymer and in particular a polyamide polymer, in particular an aliphatic, cycloaliphatic or aromatic polyamide, which may be microcrystalline or amorphous.

The long reinforcing fibers (or long fibrous reinforcement) may be an assembly of long fibers, i.e. fibers having an aspect ratio defined by the ratio of length to diameter of the fiber, which means that these fibers have in particular a circular cross-section, greater than 1000, preferably greater than 2000. In this assembly, the fibers may be continuous, in the form of a unidirectional (UD) or multidirectional (2D, 3D) reinforcer. In particular, they may be in the form of fabrics, sheets, strips or braids and may also be cut, for example in the form of nonwovens (mats) or in the form of felts.

In the case where the fibers are flattened, they have a thickness and a width and the length and width L/D aspect ratio is then greater than 1000, whether they are a long or continuous.

These long reinforcing fibers may be chosen from:
  mineral fibers, said fibers having high melting points Mp' above the melting point Mp of said semi-crystalline polyamide of the invention and above the polymerization and/or processing temperature;
  polymeric fibers or polymer fibers having a melting point Mp', or if not Mp', a glass transition temperature Tg', above the polymerization temperature or above the melting point Mp of said semi-crystalline polyamide constituting said matrix of the composite and above the processing temperature;
  or mixtures of the abovementioned fibers.

As mineral fibers suitable for the invention, mention may be made of carbon fibers, which include fibers of nanotubes or carbon nanotubes (CNTs), carbon nanofibers or graphenes; silica fibers such as glass fibers, in particular of E, R or S2 type; boron fibers; ceramic fibers, in particular silicon carbide fibers, boron carbide fibers, boron carbonitride fibers, silicon nitride fibers, boron nitride fibers, basalt fibers; fibers or filaments based on metals and/or alloys thereof; fibers of metal oxides, in particular of alumina ($Al_2O_3$); metallized fibers such as metallized glass fibers and metallized carbon fibers, or mixtures of the abovementioned fibers.

More particularly, these fibers may be chosen as follows:
  the mineral fibers may be chosen from: carbon fibers, carbon nanotube fibers, glass fibers, in particular of E, R or S2 type, boron fibers, ceramic fibers, in particular silicon carbide fibers, boron carbide fibers, boron carbonitride fibers, silicon nitride fibers, boron nitride fibers, basalt fibers, fibers or filaments based on metals and/or alloys thereof, fibers based on metal oxides such as $Al_2O_3$, metallized fibers such as metallized glass fibers and metallized carbon fibers, or mixtures of the abovementioned fibers, and
  the polymer fibers or polymeric fibers, under the abovementioned condition, are chosen from:
  thermosetting polymer fibers and more particularly those chosen from: unsaturated polyesters, epoxy resins, vinyl esters, phenolic resins, polyurethanes, cyanoacrylates and polyimides, such as bismaleimide resins, or aminoplasts resulting from the reaction of an amine such as melamine with an aldehyde such as glyoxal or formaldehyde,
  fibers of thermoplastic polymers, more particularly chosen from: polyethylene terephthalate (PET), polybutylene terephthalate (PBT),
  polyamides fibers,
  fibers of aramids (such as Kevlar®) and aromatic polyamides such as those corresponding to one of the formulae: PPD.T, MPD.I, PAA and PPA, with PPD and MPD being respectively p- and m-phenylenediamine, PAA being polyarylamides and PPA being polyphthalamides,
  fibers of polyamide block copolymers such as polyamide/polyether, fibers of polyaryl ether ketones (PAEKs) such as polyether ether ketone (PEEK), polyether ketone ketone (PEKK) or polyether ketone ether ketone ketone (PEKEKK).

The preferred long reinforcing fibers are long fibers (with a circular cross-section) chosen from: carbon fibers, including those which are metallized, glass fibers, including those which are metallized, of E, R, S2 type, fibers of aramids (such as Kevlar®) or aromatic polyamides, polyaryl ether ketone (PAEK) fibers, such as polyether ether ketone (PEEK) fibers, polyether ketone ketone (PEKK) fibers, polyether ketone ether ketone ketone (PEKEKK) fibers, or mixtures thereof.

The polymer matrix of the composition of the invention must first have a good impregnation of the reinforcing fibers, that is to say that the matrix must coat said long reinforcing fibers and thus prevent the presence of microspaces created by poor impregnation, in order to enable the transmitting to the reinforcing fibers of the mechanical stresses undergone by the composite material with thus a more effective response of said composite material to mechanical stress.

The microspaces created are capable of causing mechanical defects, in particular a delamination of the fibers, and of making the final composite material more brittle.

The expression "non-reactive composition" means that the composition is based on polyamide polymer in which the molecular weight is not capable of changing during the impregnation of the long reinforcing fibers or after impregnation of the long reinforcing fibers and which therefore corresponds to the final polyamide polymer of the thermoplastic matrix.

These polyamides according to composition b) are non-reactive, either because of the low content of reactive (residual) functions present, in particular with a content of said functions <120 meq/kg, or because of the presence of end functions of the same type at the chain end which are therefore nonreactive with one another, or because of the modification and blocking of said reactive functions by a monofunctional reactive component, for example, for the amine functions, by a modification reaction with a monoacid or a monoisocyanate and, for carboxyl functions, by reaction with a monoamine.

Advantageously, the number-average molecular weight (Mn) of said final polyamide polymer of the thermoplastic matrix of said material is preferably in a range of from 8000 to 40 000 g/mol, preferably from 10 000 to 30 000 g/mol, as determined by calculation on the basis of the content of end functions, determined by potentiometric titration in solution and the functionality of said prepolymers or by NMR. These Mn values can correspond to inherent viscosities greater than or equal to 0.8, as determined according to the standard ISO 307:2007, but changing the solvent (use of m-cresol in place of sulfuric acid and the temperature being 20° C.).

Conversely, the expression "reactive composition" means that the molecular weight of said reactive composition will change after impregnation of said long reinforcing fibers by reaction of reactive prepolymers with one another by condensation, or with a chain extender by polyaddition and, in the latter case, without elimination of volatile by-products, so as to give the final polyamide polymer of the thermoplastic matrix.

1,3-BAC (or 1,3-bis(aminomethyl)cyclohexane, CAS No. 2579-20-6) is a cycloaliphatic diamine monomer obtained in particular by hydrogenation of meta-xylenediamine (MXDA). 1,3-BAC exists in the form of two isomers, cis and trans, CAS No. 2579-20-6 corresponding to a mixture of isomers.

1,4-BAC (or 1,4-bis(aminomethyl)cyclohexane, CAS No. 2549-07-9) is a cycloaliphatic diamine monomer obtained in particular by hydrogenation of para-xylenediamine (PXDA). 1,4-BAC exists in the form of two isomers, cis and trans, CAS No. 2549-07-9 corresponding to a mixture of isomers.

Advantageously, the 1,3-BAC or the 1,4-BAC used in the BACT unit is a mixture of cis and trans isomers in a respective proportion of from 0/100 to 100/0, in particular from 75/25 to 25/75.

Advantageously, the proportion of cis-isomer in the 1,3-BAC is greater than 60%, preferentially greater than 70%, in particular greater than 80%, in particular greater than 90%.

Advantageously, the proportion of trans-isomer in the 1,4-BAC is greater than 60%, preferentially greater than 70%, in particular greater than 80%, in particular greater than 90%.

BAC and/or X can be replaced, independently of one another, up to 30 mol %, by other diamines defined below, in particular by a linear or branched aliphatic diamine, a cycloaliphatic diamine or an arylaromatic diamine such as meta-xylenediamine (MXDA).

By way of example, the linear or branched aliphatic diamine is chosen from 1,4-butanediamine, 1,5-pentanediamine, 2-methyl-1,5-pentanediamine (MPMD), 1,6 hexanediamine, 1,8-octanediamine (OMDA), 1,9-nonanediamine (NMDA), 2-methyl-1,8-octanediamine (MODA), 2,2,4-trimethylhexamethylenediamine (TMHMD), 2,4,4-trimethylhexamethylenediamine (TMHMD), 5-methyl-1,9-nonanediamine, 1,11-undecanediamine, 2-butyl-2-ethyl-1,5-pentanediamine, 1,12-dodecanediamine, 1,13-tridecanediamine, 1,14-tetradecanediamine, 1,16-hexadecanediamine and 1,18-octadecanediamine.

The cycloaliphatic diamine can be chosen from isophoronediamine, norbornanedimethylamine, 4,4'-diaminodicyclohexylmethane (PACM), 2,2-(4,4'-diaminodicyclohexyl)propane (PACP), and 3,3'-dimethyl-4,4'-diaminodicyclohexylethane (MACM).

T can be replaced, up to 30 mol %, by other dicarboxylic acids defined below, in particular by other aromatic, aliphatic or cycloaliphatic dicarboxylic acids.

The aromatic dicarboxylic acids can be chosen from naphthalenedicarboxylic acid (NDA) and isophthalic acid (IPS).

The aliphatic dicarboxylic acids can be chosen from adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid and dimerized fatty acids.

The cycloaliphatic dicarboxylic acids can be chosen from cis- and/or trans-cyclohexane-1,4-dicarboxylic acid and/or cis- and/or trans-cyclohexane-1,3-dicarboxylic acid (CHDA).

BAC and/or X and/or T can be replaced, independently of one another, up to 30 mol %, by lactams or aminocarboxylic acids.

The lactams and aminocarboxylic acids can be chosen from caprolactam (CL), α,ω-aminocaproic acid, α,ω-aminononanoic acid, α,ω-aminoundecanoic acid (AUA), lauryllactam (LL) and α,ω-aminododecanoic acid (ADA).

A maximum of 30 mol %, relative to the total sum of the BAC, X and T monomers, of replacement, whether it is with another diamine, another diacid, a lactam or an aminocarboxylic acid, or any mixture thereof, is possible.

Advantageously, a maximum of 20 mol %, relative to the total sum of the BAC, X and T monomers, of replacement, whether it is with another diamine, another diacid, a lactam or an aminocarboxylic acid, or any mixture thereof, is possible.

Advantageously, a maximum of 10 mol %, relative to the total sum of the BAC, X and T monomers, of replacement, whether it is with another diamine, another diacid, a lactam or an aminocarboxylic acid, or any mixture thereof, is possible.

In one advantageous embodiment, the present invention relates to one of the compositions for composite material Nos. 1 to 12 defined below, said composition comprising a semi-crystalline polyamide polymer and long reinforcing fibers, said semi-crystalline polyamide polymer comprising a BACT/XT copolyamide in the proportions defined in table I below:

TABLE I

| Composition No. | Semi-crystalline polyamide polymer % by volume | Long reinforcing fibers % by volume | BACT mol % | XT mol % |
|---|---|---|---|---|
| 1 | 30-60 | 40-70 | 20-70 | 30-80 |
| 2 | 30-60 | 40-70 | 25-60 | 40-75 |
| 3 | 30-60 | 40-70 | 35-55 | 45-65 |
| 4 | 30-60 | 50-65 | 20-70 | 30-80 |
| 5 | 30-60 | 50-65 | 25-60 | 40-75 |
| 6 | 30-60 | 50-65 | 35-55 | 45-65 |
| 7 | 35-50 | 40-70 | 20-70 | 30-80 |
| 8 | 35-50 | 40-70 | 25-60 | 40-75 |
| 9 | 35-50 | 40-70 | 35-55 | 45-65 |
| 10 | 35-50 | 50-65 | 20-70 | 30-80 |
| 11 | 35-50 | 50-65 | 25-60 | 40-75 |
| 12 | 35-50 | 50-65 | 35-55 | 45-65 |

Advantageously, compositions 1 to 12 comprise from 0% to 50% by weight of additives and/or of other polymers.

Advantageously, said compositions consist of a semi-crystalline polyamide polymer, of long reinforcing fibers, and of 0% to 50% by weight of additives and/or of other polymers, said semi-crystalline polyamide polymer comprising a BACT/XT copolyamide in the proportions defined in table I.

Advantageously, said compositions consist of a semi-crystalline polyamide polymer, of long reinforcing fibers, and of 0% to 50% by weight of additives and/or of other polymers, said semi-crystalline polyamide polymer consisting of a BACT/XT copolyamide in the proportions defined in table I.

Advantageously, the proportion of additives and/or of other polymers in the compositions defined above is in addition from 0% to 50% by weight.

Advantageously, in the compositions defined above, X is a $C_9$, $C_{10}$, $C_{11}$ and $C_{12}$, in particular $C_{10}$, $C_{11}$ and $C_{12}$, diamine.

The inventors have therefore found, unexpectedly, that the compositions of the invention exhibit a better crystallization capacity, a better high Tg/low Mp compromise and especially a higher enthalpy (and therefore higher hot modulus) than the prior art compositions.

In one advantageous embodiment, the present invention relates to a composition as defined above, in which said semi-crystalline polyamide polymer has a melting point Mp<290° C., preferably <285° C., more preferentially <280° C., as determined according to the standard ISO 11357-3 (2013).

In one advantageous embodiment, the present invention relates to a composition as defined above, in which said semi-crystalline polyamide polymer has a glass transition temperature Tg>120° C., preferably >130° C., more preferentially >140° C., determined according to the standard ISO 11357-2:2013.

Advantageously, the Tg is between 125 and 165° C.

In one advantageous embodiment, the present invention relates to a composition as defined above, in which said semi-crystalline polyamide polymer exhibits a difference between the melting point and the crystallization temperature Mp-Tc<40° C., preferably <30° C., determined according to the standard ISO 11357-3:2013.

In one advantageous embodiment, the present invention relates to a composition as defined above, characterized in that the heat of crystallization of the semi-crystalline polyamide polymer, measured by differential scanning calorimetry (DSC) according to the standard ISO 11357-3:2013, is greater than 40 J/g, preferably greater than 45 J/g, and even more preferentially 50 J/g.

In one advantageous embodiment, the present invention relates to a composition as defined above, characterized in that said semi-crystalline polyamide polymer has a melting point: Mp<290° C. and a Tg>120° C.

In one advantageous embodiment, the present invention relates to a composition as defined above, characterized in that said semi-crystalline polyamide polymer has a melting point: Mp<290° C. and a Tg>130° C.

In one advantageous embodiment, the present invention relates to a composition as defined above, characterized in that said semi-crystalline polyamide polymer has a melting point: Mp<290° C. and a Tg>140° C.

In one advantageous embodiment, the present invention relates to a composition as defined above, characterized in that said semi-crystalline polyamide polymer has a melting point: Mp<285° C. and a Tg>120° C.

In one advantageous embodiment, the present invention relates to a composition as defined above, characterized in that said semi-crystalline polyamide polymer has a melting point: Mp<285° C. and a Tg>130° C.

In one advantageous embodiment, the present invention relates to a composition as defined above, characterized in that said semi-crystalline polyamide polymer has a melting point: Mp<285° C. and a Tg>140° C.

In one advantageous embodiment, the present invention relates to a composition as defined above, characterized in that said semi-crystalline polyamide polymer has a melting point: Mp<280° C. and a Tg>120° C.

In one advantageous embodiment, the present invention relates to a composition as defined above, characterized in that said semi-crystalline polyamide polymer has a melting point: Mp<280° C. and a Tg>130° C.

In one advantageous embodiment, the present invention relates to a composition as defined above, characterized in that said semi-crystalline polyamide polymer has a melting point: Mp<280° C. and a Tg>140° C.

In one advantageous embodiment, the present invention relates to a composition as defined above, characterized in that said semi-crystalline polyamide polymer has the following characteristics (table II):

TABLE II

| Composition No. | Initial compositions | Mp (° C.) | Tg (° C.) | Mp-Tc (° C.) | Delta Hc (J/g) |
|---|---|---|---|---|---|
| 13 | Compositions 1 to 12 | <290 | >120° C. | | |
| 14 | Compositions 1 to 12 | <290 | >130° C. | | |
| 15 | Compositions 1 to 12 | <290 | >140° C. | | |
| 16 | Compositions 1 to 12 | <285 | >120° C. | | |
| 17 | Compositions 1 to 12 | <285 | >130° C. | | |
| 18 | Compositions 1 to 12 | <285 | >140° C. | | |
| 19 | Compositions 1 to 12 | <280 | >120° C. | | |
| 20 | Compositions 1 to 12 | <280 | >130° C. | | |
| 21 | Compositions 1 to 12 | <280 | >140° C. | | |
| 22 | Compositions 1 to 12 | <290 | >120° C. | <40 | |
| 23 | Compositions 1 to 12 | <290 | >130° C. | <40 | |
| 24 | Compositions 1 to 12 | <290 | >140° C. | <40 | |
| 25 | Compositions 1 to 12 | <285 | >120° C. | <40 | |
| 26 | Compositions 1 to 12 | <285 | >130° C. | <40 | |
| 27 | Compositions 1 to 12 | <285 | >140° C. | <40 | |
| 28 | Compositions 1 to 12 | <280 | >120° C. | <40 | |
| 29 | Compositions 1 to 12 | <280 | >130° C. | <40 | |
| 30 | Compositions 1 to 12 | <280 | >140° C. | <40 | |

TABLE II-continued

| Composition No. | Initial compositions | Mp (° C.) | Tg (° C.) | Mp-Tc (° C.) | Delta Hc (J/g) |
|---|---|---|---|---|---|
| 31 | Compositions 1 to 12 | <290 | >120° C. | <30 | |
| 32 | Compositions 1 to 12 | <290 | >130° C. | <30 | |
| 33 | Compositions 1 to 12 | <290 | >140° C. | <30 | |
| 34 | Compositions 1 to 12 | <285 | >120° C. | <30 | |
| 35 | Compositions 1 to 12 | <285 | >130° C. | <30 | |
| 36 | Compositions 1 to 12 | <285 | >140° C. | <30 | |
| 37 | Compositions 1 to 12 | <280 | >120° C. | <30 | |
| 38 | Compositions 1 to 12 | <280 | >130° C. | <30 | |
| 39 | Compositions 1 to 12 | <280 | >140° C. | <30 | |
| 40 | Compositions 1 to 12 | <290 | >120° C. | <40 | >40 |
| 41 | Compositions 1 to 12 | <290 | >130° C. | <40 | >40 |
| 42 | Compositions 1 to 12 | <290 | >140° C. | <40 | >40 |
| 43 | Compositions 1 to 12 | <285 | >120° C. | <40 | >40 |
| 44 | Compositions 1 to 12 | <285 | >130° C. | <40 | >40 |
| 45 | Compositions 1 to 12 | <285 | >140° C. | <40 | >40 |
| 46 | Compositions 1 to 12 | <280 | >120° C. | <40 | >40 |
| 47 | Compositions 1 to 12 | <280 | >130° C. | <40 | >40 |
| 48 | Compositions 1 to 12 | <280 | >140° C. | <40 | >40 |
| 49 | Compositions 1 to 12 | <290 | >120° C. | <30 | >40 |
| 50 | Compositions 1 to 12 | <290 | >130° C. | <30 | >40 |
| 51 | Compositions 1 to 12 | <290 | >140° C. | <30 | >40 |
| 52 | Compositions 1 to 12 | <285 | >120° C. | <30 | >40 |
| 53 | Compositions 1 to 12 | <285 | >130° C. | <30 | >40 |
| 54 | Compositions 1 to 12 | <285 | >140° C. | <30 | >40 |
| 55 | Compositions 1 to 12 | <280 | >120° C. | <30 | >40 |
| 56 | Compositions 1 to 12 | <280 | >130° C. | <30 | >40 |
| 57 | Compositions 1 to 12 | <280 | >140° C. | <30 | >40 |
| 58 | Compositions 1 to 12 | <290 | >120° C. | <40 | >45 |
| 59 | Compositions 1 to 12 | <290 | >130° C. | <40 | >45 |
| 60 | Compositions 1 to 12 | <290 | >140° C. | <40 | >45 |
| 61 | Compositions 1 to 12 | <285 | >120° C. | <40 | >45 |
| 62 | Compositions 1 to 12 | <285 | >130° C. | <40 | >45 |
| 63 | Compositions 1 to 12 | <285 | >140° C. | <40 | >45 |
| 64 | Compositions 1 to 12 | <280 | >120° C. | <40 | >45 |
| 65 | Compositions 1 to 12 | <280 | >130° C. | <40 | >45 |
| 66 | Compositions 1 to 12 | <280 | >140° C. | <40 | >45 |
| 67 | Compositions 1 to 12 | <290 | >120° C. | <30 | >45 |
| 68 | Compositions 1 to 12 | <290 | >130° C. | <30 | >45 |
| 69 | Compositions 1 to 12 | <290 | >140° C. | <30 | >45 |
| 70 | Compositions 1 to 12 | <285 | >120° C. | <30 | >45 |
| 71 | Compositions 1 to 12 | <285 | >130° C. | <30 | >45 |
| 72 | Compositions 1 to 12 | <285 | >140° C. | <30 | >45 |
| 73 | Compositions 1 to 12 | <280 | >120° C. | <30 | >45 |
| 74 | Compositions 1 to 12 | <280 | >130° C. | <30 | >45 |
| 75 | Compositions 1 to 12 | <280 | >140° C. | <30 | >45 |
| 76 | Compositions 1 to 12 | <290 | >120° C. | <40 | >50 |
| 77 | Compositions 1 to 12 | <290 | >130° C. | <40 | >50 |
| 78 | Compositions 1 to 12 | <290 | >140° C. | <40 | >50 |
| 79 | Compositions 1 to 12 | <285 | >120° C. | <40 | >50 |
| 80 | Compositions 1 to 12 | <285 | >130° C. | <40 | >50 |
| 81 | Compositions 1 to 12 | <285 | >140° C. | <40 | >50 |
| 82 | Compositions 1 to 12 | <280 | >120° C. | <40 | >50 |
| 83 | Compositions 1 to 12 | <280 | >130° C. | <40 | >50 |
| 84 | Compositions 1 to 12 | <280 | >140° C. | <40 | >50 |
| 85 | Compositions 1 to 12 | <290 | >120° C. | <30 | >50 |
| 86 | Compositions 1 to 12 | <290 | >130° C. | <30 | >50 |
| 87 | Compositions 1 to 12 | <290 | >140° C. | <30 | >50 |
| 88 | Compositions 1 to 12 | <285 | >120° C. | <30 | >50 |
| 89 | Compositions 1 to 12 | <285 | >130° C. | <30 | >50 |
| 90 | Compositions 1 to 12 | <285 | >140° C. | <30 | >50 |
| 91 | Compositions 1 to 12 | <280 | >120° C. | <30 | >50 |
| 92 | Compositions 1 to 12 | <280 | >130° C. | <30 | >50 |
| 93 | Compositions 1 to 12 | <280 | >140° C. | <30 | >50 |

In one advantageous embodiment, the present invention relates to a composition as defined above, characterized in that the BAC is 1,3-BAC.

Advantageously, the 1,3-BAC is a mixture of cis and trans isomers in a respective proportion of from 0/100 to 100/0, in particular from 75/25 to 25/75.

Advantageously, the proportion of cis-isomer in the 1,3-BAC is greater than 60%, preferentially greater than 70%, in particular greater than 80%, in particular greater than 90%.

In one advantageous embodiment, the present invention relates to a composition as defined above, in which the BAC is 1,3-BAC, and XT is chosen from 9T, 10T, 11T and 12T, more preferentially 10T, 11T and 12T.

Advantageously, XT is 10T, 10 corresponding to 1,10-decanediamine.

In one advantageous embodiment, the present invention relates to a composition as defined above, in which the sum of the monomers which replace the terephthalic acid, the BAC and X is equal to 0.

There is consequently no longer any possible replacement of the monomers in compositions 1 to 40 as defined above.

In one advantageous embodiment, the present invention relates to a composition as defined above, characterized in that said semi-crystalline polyamide polymer is a non-reactive composition according to b).

This means that said composition is the same as that of the matrix (polyamide) polymer of said composite, since there is an absence of reaction in this composition, which remains stable and unchanging in terms of molecular weight when it is heated for the processing of the composite material of the invention. The characteristics of the polyamide polymer in this composition are the same, with Mp, Tg, Mp-Tc and Delta He as already defined above, as those of the final polymer.

The polyamides according to b) are obtained by a conventional polycondensation reaction from the monomer components which are diamines, diacids and optionally amino acids or lactams, in particular in the context of replacement of the monomers.

In one advantageous embodiment, the present invention relates to a composition as defined above, characterized in that said polyamide composition is a reactive composition of prepolymer according to a) and precursor of said polyamide polymer of said matrix of the composite.

According to the reactive composition a), it is possible to distinguish three possibilities given in detail below:

Advantageously, said composition a) comprises or consists of at least one reactive prepolymer carrying, on the same chain, two end functions X' and Y' which are respectively coreactive with one another by condensation, with X' and Y' being amine and carboxyl or carboxyl and amine respectively.

The prepolymer is a reactive polyamide bearing, on the same chain (that is to say on the same prepolymer), two end functions X' and Y', which functions are respectively coreactive with one another by condensation.

This condensation (or polycondensation) reaction can bring about the elimination of byproducts. The latter can be eliminated by preferably working according to a process using an open-mold technology. In the case of a closed-mold process, a step of degassing, preferably under vacuum, the by-products eliminated by the reaction is present, in order to prevent the formation of microbubbles of the by-products in the final composite material, which (microbubbles) can affect the mechanical performance levels of said material if they are not eliminated in this way.

After condensation, the characteristics of the final polyamide polymer obtained, in this composition, are the same, with Mp, Tg, Mp-Tc and Delta He as already defined above.

Advantageously, said reactive composition a) comprises at least two polyamide prepolymers which are reactive with one another and which each respectively carry two identical end functions X' or Y', said function X' of a prepolymer being able to react only with said function Y' of the other prepolymer, in particular by condensation, more particularly with X' and Y' being amine and carboxyl or carboxyl and amine respectively.

In the same way, this condensation (or polycondensation) reaction can bring about the elimination of by-products which can be eliminated as defined above.

After condensation, the characteristics of the final polyamide polymer obtained, in this composition, are the same, with Mp, Tg, Mp-Tc and Delta He as already defined above.

Advantageously, said composition a) or precursor composition comprises or consists of:

a1) at least one prepolymer of said thermoplastic polyamide polymer, carrying n end reactive functions X', chosen from: —$NH_2$, —$CO_2H$ and —OH, preferably $NH_2$ and —$CO_2H$, with n being from 1 to 3, preferably from 1 to 2, more preferably 1 or 2, more particularly 2, a2) at least one chain extender Y-A'-Y, with A' being a hydrocarbon biradical of nonpolymeric structure, carrying 2 identical end reactive functions Y, which are reactive by polyaddition with at least one function X' of said prepolymer a1), preferably with a molecular weight of less than 500 and more preferably of less than 400.

Mention may be made, as suitable examples of extenders a2) as a function of the functions X' carried by said semicrystalline polyamide prepolymer a1), of the following:

when X' is $NH_2$ or OH, preferably $NH_2$:
  either the chain extender Y-A'-Y corresponds to
    Y chosen from the groups: maleimide, optionally blocked isocyanate, oxazinone, oxazolinone et epoxy,
    and
    A' is a hydrocarbon-based spacer optionally comprising one or more heteroatoms, and linking the functions Y with one another, in particular A' is a hydrocarbon-based spacer or a carbon-based radical bearing the reactive functions or groups Y, chosen from:
      a covalent bond between two functions (groups) Y in the case where Y=oxazinone et oxazolinone
      or
      an aliphatic hydrocarbon-based chain or an aromatic and/or cycloaliphatic hydrocarbon-based chain, the latter two comprising at least one optionally substituted ring of 5 or 6 carbon atoms, with optionally said aliphatic hydrocarbon-based chain optionally having a molecular weight of 14 to 400 g·$mol^{-1}$
  or the chain extender Y-A'-Y corresponds to Y being a caprolactam group and to A' being able to be a carbonyl radical, such as carbonylbiscaprolactam, or to A' being able to be a terephthaloyl or an isophthaloyl,
  or said chain extender Y-A'-Y carries a cyclic anhydride group Y, and preferably this extender is chosen from a cycloaliphatic and/or aromatic carboxylic dianhydride and more preferably it is chosen from: ethylenetetracarboxylic dianhydride, pyromellitic dianhydride, 3,3',4,4'-biphenyltetracarboxylic dianhydride, 1,4,5,8-naphthalenetetracarboxylic dianhydride, perylenetetracarboxylic dianhydride, 3,3',4,4'-benzophenone tetracarboxylic dianhydride, 1,2,3,4-cyclobutanetetracarboxylic dianhydride, hexafluoroisopropylidene bisphthalic dianhydride, 9,9-bis(trifluoromethyl)xanthenetetracarboxylic dianhydride, 3,3',4,4'-diphenylsulfone tetracarboxylic dianhydride, bicyclo[2.2.2]oct-7-ene-2,3,5,6-tetracarboxylic dianhydride, 1,2,3,4-cyclopentanetetracarboxylic dianhydride, 3,3',4,4'-diphenyl ether tetracarboxylic dianhydride or mixtures thereof and
when X' is COOH:
  said chain extender Y-A'-Y corresponds to:
    Y chosen from the following groups: epoxy, oxazoline, oxazine, imidazoline or aziridine, such as 1,1'-iso- or terephthaloyl bis(2-methylaziridine),
    A' being a carbon-based spacer (radical) as defined above.

More particularly, when, in said extender Y-A'-Y, said function Y is chosen from oxazinone, oxazolinone, oxazine, oxazoline or imidazoline, in this case, in the chain extender represented by Y-A'-Y, A' can represent an alkylene, such as —$(CH_2)_m$— with m ranging from 1 to 14 and preferably from 2 to 10, or A' can represent a cycloalkylene and/or an arylene which is substituted (alkyl) or unsubstituted, such as benzenic arylenes, for example o-, m- or p-phenylenes, or naphthalenic arylenes, and preferably A' is an arylene and/or a cycloalkylene.

In the case of carbonyl- or terephthaloyl- or isophthaloylbiscaprolactam as chain extender Y-A'-Y, the preferred conditions avoid the elimination of byproduct, such as caprolactam, during said polymerization and processing in the molten state.

In the optional case mentioned above where Y represents a blocked isocyanate function, this blocking can be obtained by blocking agents for the isocyanate function, such as epsilon-caprolactam, methyl ethyl ketoxime, dimethylpyrazole or diethyl malonate.

Likewise, in the case where the extender is a dianhydride which reacts with a prepolymer P(X')n where X'=$NH_2$, the preferred conditions prevent any formation of an imide ring during the polymerization and during the processing in the molten state.

As examples of chain extenders comprising a reactive function Y=epoxy which are suitable for implementing the invention, mention may be made of optionally substituted aliphatic, cycloaliphatic or aromatic diepoxides. As examples of aliphatic diepoxides, mention may be made of aliphatic diol diglycidyl ethers, as aromatic diepoxides, mention may be made of bisphenol A diglycidyl ethers such as bisphenol A diglycidyl ether (BADGE) and, as cycloaliphatic diepoxides, mention may be made of cycloaliphatic diol or hydrogenated bisphenol A diglycidyl ethers. More generally, as examples of diepoxides that are suitable for use according to the invention, mention may be made of bisphenol A diglycidyl ether (BADGE), and its (cycloaliphatic) hydrogenated derivative, bisphenol F diglycidyl ether, tetrabromo bisphenol A diglycidyl ether, or hydroquinone diglycidyl ether, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether of Mn<500, polypropylene glycol diglycidyl ether of Mn<500, polytetramethylene glycol diglycidyl ether of Mn<500, resorcinol diglycidyl ether, neopentyl glycol diglycidyl ether, bisphenol A polyethylene glycol diglycidyl ether of Mn<500, bisphenol A polypropylene glycol diglycidyl ether of Mn<500, diglycidyl esters of a dicarboxylic acid, such as terephthalic acid glycidyl ester, or epoxidized diolefins (dienes) or fatty acids with a double epoxidized ethylenic unsaturation, diglycidyl 1,2-cyclohexanedicarboxylate, and mixtures of the diepoxides mentioned.

As examples of chain extenders bearing oxazoline or oxazine reactive functions Y that are suitable for the implementation of the invention, reference may be made to those described under references "A", "B", "C" and "D" on page 7 of application EP 0 581 642, and also to the processes for preparing same and the modes of reaction thereof which are disclosed therein. "A" in this document is bisoxazoline, "B" is bisoxazine, "C" is 1,3-phenylenebisoxazoline and "D" is 1,4-phenylenebisoxazoline.

Reference may be made, as examples of chain extenders having an imidazoline reactive function Y which are suitable for the implementation of the invention, to those described ("A" to "F") on pages 7 to 8 and table 1 on page 10 in the application EP 0 739 924, and also to their processes of preparation and their modes of reaction which are disclosed therein.

Reference may be made, as examples of chain extenders having a reactive function Y=oxazinone or oxazolinone which are suitable for the implementation of the invention, to those described under references "A" to "D" on pages 7 to 8 of the application EP 0 581 641, and also to their processes of preparation and their modes of reaction which are disclosed therein.

Mention may be made, as examples of oxazinone (ring having 6 atoms) and oxazolinone (ring having 5 atoms) groups Y which are suitable, of the groups Y derived from: benzoxazinone, oxazinone or oxazolinone, with as spacer A' which can be a covalent single bond with for respective corresponding extenders being: bis(benzoxazinone), bisoxazinone and bisoxazolinone. A' can also be a $C_1$ to $C_{14}$, preferably $C_2$ to $C_{10}$, alkylene but A' is preferably an arylene and more particularly it can be a phenylene (substituted by Y in the 1,2 or 1,3 or 1,4 positions) or a naphthalene radical (disubstituted by Y) or a phthaloyl (iso- or terephthaloyl) or A' can be a cycloalkylene.

For the Y functions such as oxazine (6-membered ring), oxazoline (5-membered ring) and imidazoline (5-membered ring), the radical A' can be as described above with it being possible for A' to be a single covalent bond and with the respective corresponding extenders being: bisoxazine, bisoxazoline and bisimidazoline. A' may also be a $C_1$ to $C_{14}$, preferably $C_2$ to $C_{10}$, alkylene. The radical A' is preferably an arylene and it can more particularly be a phenylene (substituted by Y in the 1,2 or 1,3 or 1,4 positions) or a naphthalene radical (disubstituted by Y) or a phthaloyl (iso- or terephthaloyl) or A' can be a cycloalkylene.

In the case where Y=aziridine (3-membered nitrogenous heterocycle equivalent to ethylene oxide with replacement of the ether —O— by —NH—), the radical A' can be a phthaloyl (1,1'-iso- or terephthaloyl) with, as an example of an extender of this type, 1,1'-isophthaloylbis(2-methylaziridine).

The presence of a catalyst of the reaction between said prepolymer P(X')n and said extender Y-A'-Y at a content ranging from 0.001% to 2%, preferably from 0.01% to 0.5%, with respect to the total weight of the two coreactants mentioned, can accelerate the (poly)addition reaction and thus shorten the production cycle.

According to a more particular case of the choice of said extender, A' can represent an alkylene, such as —$(CH_2)_m$— with m ranging from 1 to 14 and preferably from 2 to 10, or represents an alkyl-substituted or unsubstituted arylene, such as benzenic arylenes (such as o-, m- or p-phenylenes) or naphthalenic arylenes (with arylenes: naphthalenylenes). Preferably, A' represents an arylene which may be a substituted or unsubstituted benzenic or naphthalenic arylene.

As already specified, said chain extender (a2) has a nonpolymeric structure and preferably a molecular weight of less than or equal to 500, more preferentially of less than or equal to 400.

Said reactive prepolymers of said reactive composition a), according to the three options mentioned above, have a number-average molecular weight Mn ranging from 500 to 10 000, preferably from 1000 to 6000. All the weights Mn are determined by potentiometer or by NMR (Postma et al. (Polymer, 47, 1899-1911 (2006)).

In the case of the reactive compositions of the invention according to definition a), said reactive prepolymers are prepared by conventional polycondensation reaction between the diamine and corresponding diacid components and optionally (according to the replacements) amino acid or lactam components. The prepolymers bearing amine and carboxyl functions X' and Y' on the same chain can be obtained, for example, by adding a combination of monomers (amino acid, diamine, diacid) having in total an equal amount of amine and carboxyl units, but by not carrying out the reaction to complete conversion. Another route for obtaining these prepolymers carrying an X' function and a Y' is, for example, by combining a prepolymer carrying 2 identical X'=amine functions with a diacid prepolymer carrying Y'=carboxyl, with an overall molar content of acid functions equal to that of the starting amine functions X'.

In order to obtain prepolymers functionalized with identical (amine or carboxyl) functions on the same chain, it is sufficient to have an excess of diamine (or of amine functions overall) in order to have amine end functions or an excess of diacid (or of carboxyl functions overall) in order to have carboxyl end functions.

In the case of a prepolymer P(X')n with n identical functions X', the functionality 1 can be obtained in the presence of a blocking monofunctional component (monoacid or monoamine, depending on the nature of X=amine or carboxyl).

A functionality n=2 can be obtained starting from bifunctional components: diamines and diacids with excess of one to attach X depending on this excess.

For n=3, for example, for a prepolymer P(X')n, the presence of a trifunctional component is necessary, for example the presence of a triamine (one mol per prepolymer chain) with a diamine in the reaction with a diacid. The preferred functionality for P(X')n is n=2.

In one advantageous embodiment, the present invention relates to a composition as defined above, said composition a) or precursor composition comprising or consisting of:
a1) at least one prepolymer of said thermoplastic polyamide polymer, carrying n end reactive functions X', and
a2) at least one chain extender Y-A'-Y,
in which X' is $NH_2$ or OH, in particular $NH_2$, and Y is chosen from an anhydride, in particular 3,3',4,4'-benzophenone tetracarboxylic dianhydride, an oxazinone, an oxazolinone and an epoxy.

In one advantageous embodiment, the present invention relates to a composition as defined above, said composition a) or precursor composition comprising or consisting of:
a1) at least one prepolymer of said thermoplastic polyamide polymer, carrying n end reactive functions X', and
a2) at least one chain extender Y-A'-Y,
in which X' is $CO_2H$ and Y is chosen from an epoxy and an oxazoline.

Advantageously, X' is $CO_2H$ and Y-A'-Y is chosen from phenylenebisoxazolines, preferably 1,3-phenylenebis(2-oxazoline) or 1,4-phenylenebis(2-oxazoline) (PBO).

In one advantageous embodiment, the present invention relates to a composition as defined above, characterized in that it comprises a1) at least one amino prepolymer (bearing —NH$_2$) of said semi-crystalline polyamide polymer of the thermoplastic matrix, in particular with at least 50% and more particularly with 100% of the end groups of said prepolymer a1) being primary amine functions —NH$_2$, and a2) at least one non-polymeric chain extender bearing a cyclic carboxylic anhydride group, preferably borne by an aromatic ring, having as substituent a group comprising an ethylenic or acetylenic unsaturation, preferably acetylenic unsaturation, said carboxylic anhydride group possibly being in acid, ester, amide or imide form with said extender a2) being present in a content corresponding to an a2)/(—NH$_2$) molar ratio of less than 0.36, preferably ranging from 0.1 to 0.35, more preferentially ranging from 0.15 to 0.35 and even more preferentially ranging from 0.15 to 0.31, and in that said thermoplastic polymer of the matrix is the product of the polymerization reaction by extension of said prepolymer a1) by said extender a2).

Said reaction, through the choice of the components a1) and a2) and of the specific molar ratio thereof, results in a final thermoplastic polymer which is not crosslinked.

Said prepolymer a1) bears primary amine groups represented by —NH$_2$. More particularly, it should be noted that the average number of primary amine groups per molecule of prepolymer a1), in other words the average functionality with respect to primary amine groups, can range from 1 to 3 and preferably from 1 to 2. In particular, the functionality of said prepolymer a1) of at least 50% of the end groups of said prepolymer a1) being —NH$_2$ primary amine functions, this means that it is possible for a portion to be carboxyl groups or blocked chain ends without a reactive group and, in this case, the average —NH$_2$ functionality can thus range from 1 to 3 and preferably from 1 to 2.

The term "thermoplastic" in the case of the present invention means that the polymer resulting from the reaction of the prepolymer a1) and of the extender a2) is essentially thermoplastic, which means that it contains less than 15% of its weight, preferably less than 10% of its weight and more preferentially less than 5% of its weight and even more preferentially 0% of its weight (to within 0.5% or to within 1%), of crosslinked polymers which are insoluble or infusible.

Said extender a2) can be chosen from:
- ethynyl o-phthalic, methylethynyl o-phthalic, phenylethynyl o-phthalic, naphthylethynyl o-phthalic, 4-(o-phthaloylethynyl) o-phthalic or 4-(phenyl ethynyl ketone) o-phthalic, the latter also being called 4-(phenylethynyl) trimellitic, anhydrides and anhydride derivatives in acid, ester, amide or imide form,
- ethynyl isophthalic, methylethynyl isophthalic, phenylethynyl isophthalic, naphthylethynyl isophthalic, 4-(o-phthaloylethynyl) isophthalic, 4-(phenyl ethynyl ketone) isophthalic, ethynyl terephthalic, methylethynyl terephthalic, phenylethynyl terephthalic, naphthylethynyl terephthalic, 4-(o-phthaloylethynyl) terephthalic, ethynyl benzoic, methylethynyl benzoic, phenylethynyl benzoic, naphthylethynyl benzoic or 4-(o-phthaloylethynyl) benzoic acids or acid esters or amides.

Advantageously, said extender a2) is chosen from aromatic anhydride compounds, preferably o-phthalic anhydride compounds, substituted, in position 4 of the aromatic ring, by a substituent defined by a group R—C≡C—(R')x- with R being a C$_1$-C$_2$ alkyl or H or aryl, in particular phenyl, or R is the residue of an aromatic carboxylic anhydride, preferably o-phthalic anhydride, bonded to the acetylenic triple bond via the carbon in position 4 of the aromatic ring and x being equal to 0 or to 1, and when x is equal to 1, R' is a carbonyl group.

Advantageously, said extender a2) is chosen from o-phthalic aromatic anhydride compounds bearing, in position 4, a substituent group chosen from methylethynyl, phenylethynyl, 4-(o-phthaloyl)ethynyl or phenyl ethynyl ketone, also called (phenylethynyl) trimellitic anhydride, and preferably bearing, in position 4, a substituent group chosen from methylethynyl and phenyl ethynyl ketone.

Advantageously, said extender a2), as defined above and regardless of its structure, has a molecular weight of less than or equal to 500, preferably less than or equal to 400.

Advantageously, the content of said extender a2), as defined above and regardless of its structure, in said polyamide polymer ranges from 1% to 20%, in particular from 5% to 20%.

In one advantageous embodiment, the present invention relates to a composition as defined above, characterized in that the long reinforcing fibers have in particular a circular cross-section with L/D>1000, preferably >2000 and more particularly selected from glass fibers, carbon fibers, ceramic fibers, aramid fibers or mixtures thereof.

Preferentially, these fibers have a circular cross-section.

The fiber assembly may be random (mat), unidirectional (UD) or multidirectional (2D, 3D, or the like). The grammage thereof, i.e. the weight thereof per square meter, can range from 100 to 1000 g/m$^2$, preferably from 200 to 700 g/m$^2$. The long reinforcing fibers may be in woven or nonwoven form, in particular in the form of reinforcing cloths and fabrics. They can in particular be assembled and linked in the form of a preform already having the shape of the final part. As suitable linking agent, use may be made of a composition according to a) or b) and, failing this, a linking agent compatible with said composition (composition a) or b)).

In one advantageous embodiment, the present invention relates to a composition as defined above, characterized in that it is a molding composition.

According to another aspect, the present invention relates to a process for manufacturing a thermoplastic composite material, in particular a mechanical part or a structural part based on said material, having a composition as defined above, characterized in that it comprises at least one step of polymerization of at least one reactive composition a) as defined above or a step of molding or of processing at least one nonreactive composition b) as defined above.

In one advantageous embodiment, the present invention relates to a process for manufacturing a thermoplastic composite material as defined above, characterized in that it comprises the following steps:

i) melt impregnation of a long fibrous reinforcement with a composition as defined above but not comprising said long fibrous reinforcement in an open or closed mold or out of mold, in order to obtain a composition as defined above, ii) polymerization reaction in the case of a reactive composition a) of polyamide as defined above, by heating said composition of stage i) with chain extension, as the case may be, by a polycondensation reaction or by a bulk melt polyaddition reaction, with, in the case of the polycondensation, removal under vacuum of the condensation products when a closed mold is involved, using a vacuum extraction system, otherwise and preferably with the polycondensation being carried out in an open mold or out of mold, iii) processing or molding of said composition of stage i), in the case of a nonreactive polyamide composition b), in order to form the final composite part in a mold or with another processing system, and, in the case of a reactive composition a), a stage of processing by molding or by another processing system and simultaneously with polymerization stage ii).

In the process of the invention, said processing can preferably be carried out according to an RTM, C-RTM, S-RIM, injection-compression molding or pultrusion process or by infusion molding, in particular in the case of a reactive composition a).

According to another aspect, the present invention relates to a semi-crystalline polyamide polymer, characterized in that it corresponds to (or is) the polymer of the thermoplastic matrix of said thermoplastic composite material, as defined above, said polymer being a non-reactive polymer as defined according to said composition b) or a polymer that can be obtained from a reactive composition as defined according to said composition a).

This thermoplastic polymer is by definition one of the essential components of the composition of the thermoplastic composite material of the present invention and is therefore part of the invention as a product linked to the present invention with the same common inventive concept in the face of the same technical problem to be solved. The invention therefore also covers the use of said thermoplastic polymer according to the invention as thermoplastic matrix of a thermoplastic composite based on a fibrous reinforcement as described above.

According to yet another aspect, the present invention relates to the use of a composition as defined above or of a polymer as defined above, for manufacturing mechanical or structural parts based on said composite material.

In one advantageous embodiment, the present invention relates to the use as defined above, characterized in that said mechanical or structural parts of said composite material concern applications in the motor vehicle, railway, marine (maritime) and wind power fields, the photovoltaic field, the solar energy field, including solar panels and components of solar power stations, the sport field, the aeronautical and aerospace field, and the road transport (regarding trucks), construction, civil engineering, panel and leisure fields.

Advantageously, said applications are in the wind power field and said Tg of said polyamide is greater than 120° C., preferably greater than 130° C., more preferentially greater than 140° C.

Advantageously, said applications are in the motor vehicle field and said Tg of said polyamide is greater than 120° C., preferably greater than 130° C., more preferentially greater than 140° C.

Advantageously, said applications are in the aeronautical field and said Tg of said polyamide is greater than 120° C., preferably greater than 130° C., more preferentially greater than 140° C.

According to another aspect, the present invention relates to a thermoplastic composite material characterized in that it results from the use of at least one composition for thermoplastic composite material as defined above.

Said thermoplastic composite material therefore comprises a thermoplastic matrix based on a semi-crystalline polyamide polymer as defined above.

According to yet another aspect, the present invention relates to a mechanical or structural part made from thermoplastic composite material, characterized in that it results from the use of at least one composition as defined above or from the use of a polyamide polymer as defined above, or that it is based on a composite material as defined above or that it is obtained by means of a process as defined above.

The mechanical or structural part of thermoplastic composite material therefore comprises a thermoplastic matrix based on a semi-crystalline polyamide polymer as defined above or is based on a composite material as defined above or is obtained by means of a process as defined above.

Advantageously, said structural part defined above is a motor vehicle part post-treated by cataphoresis.

Advantageously, said structural part defined above is a part for the wind power industry.

Advantageously, said structural part defined above is a part for the aeronautical industry.

Methods for Determining the Characteristics Mentioned

The measurement of the intrinsic or inherent viscosity is carried out in m-cresol. The method is well known to those skilled in the art. The standard ISO 307:2007 is followed but with the solvent being changed (use of m-cresol instead of sulfuric acid and the temperature being 20° C.).

The glass transition temperature Tg is measured using a differential scanning calorimeter (DSC), after a second heating cycle, according to the standard ISO 11357-2: 2013. The heating and cooling rate is 20° C./min.

The melting point Mp and the crystallization temperature Tc are measured by DSC, according to the standard ISO 11357-3:2013. The heating and cooling rate is 20° C./min.

The heat of crystallization of said matrix polymer is measured by differential scanning calorimetry (DSC) according to the standard ISO 11357-3:2013.

The modulus E' at 180° C. is obtained from curves of dynamic mechanical analysis (DMA) carried out on bars in tension mode, using a temperature gradient of 2° C./min, a frequency of 1 Hz and an amplitude of 10 μm.

The Mn of the prepolymer is determined by titration (assay) of the COOH or $NH_2$ end functions according to a potentiometric method and from a theoretical functionality of 2.

DESCRIPTION OF THE FIGURES

FIG. 1 shows the Mp, Tg, Tc and Deltac He curves obtained as a function of the molar percentage of BACT in a BACT/10T copolyamide.
The curves represent:
Solid circles: Mp.
Empty circles: Tc.
Squares: Tg
Diamonds: Heat of crystallization.

Examples

A—Preparation of a Polyamide Polymer by the Direct Route (without Chain Extension)

The following procedure is an example of a preparation process, and is not limiting. It is representative of all the compositions according to the invention:
5 kg of the following starting materials are introduced into a 14-liter autoclave reactor:
500 g of water,
the diamines,
the amino acid (optionally), the terephthalic acid and optionally one or more other diacid(s), the monofunctional chain regulator: benzoic acid, in an amount suitable for the targeted Mn and varying (benzoic acid) from 50 to 100 g, 35 g of sodium hypophosphite in solution, 0.1 g of a Wacker AK1000 antifoaming agent (Wacker Silicones).

The natures and molar ratios of the molecular structures and units of the polyamides (by referenced test) are given in table III below.

The closed reactor is purged of its residual oxygen and then heated to a temperature of 230° C. with respect to the material introduced. After stirring for 30 minutes under these conditions, the pressurized vapor which has formed in the reactor is gradually reduced in pressure over 60 minutes, while gradually increasing the internal temperature so that it becomes established at Mp+10° C. at atmospheric pressure.

The polymerization is then continued under nitrogen flushing of 20 l/h until the viscosity shown in the characteristics table is obtained.

The polymer is subsequently emptied out via the bottom valve, then cooled in a water trough and then granulated.

The results are given in the following tables III-VI. They were obtained using 1,3-BAC having a cis/trans ratio of 75/25 mol %.

TABLE III

| Ref | 10T mol % | BACT mol % | Mp ° C. | Tc ° C. | Mp – Tc ° C. | DeltaHc J/g | Tg ° C. | Inherent viscosity | E' 180° C. MPa |
|---|---|---|---|---|---|---|---|---|---|
| C 10T* | 100.0 | 0.0 | 314 | 279 | 35 | 63 | 120 | insoluble | — |
| I1 | 60.0 | 40.0 | 275.6 | 241.7 | 33.9 | 60.8 | 134.0 | 0.92 | — |
| I2 | 50.0 | 50.0 | 281.7 | 248.3 | 33.4 | 53.5 | 153.4 | 1.05 | 805.3 |
| I3 | 50.0 | 50.0 | 279.4 | 242.5 | 36.9 | 55.5 | 146.0 | 0.93 | — |
| I4 | 45.0 | 55.0 | 279.8 | 252.0 | 27.8 | 62.2 | 142.7 | 0.87 | — |
| I5 | 45.0 | 55.0 | 282.0 | 253.5 | 28.5 | 49.7 | 160.2 | 1.09 | — |
| I6 | 40.0 | 60.0 | 286.1 | 250.4 | 35.7 | 57.0 | 163.9 | 0.94 | 886 |
| I7 | 30.0 | 70.0 | 289.7 | 258.6 | 31.1 | 40.6 | 165.6 | 0.86 | — |
| C BACT* | 0.0 | 100.0 | 349 | — | — | — | 187 | — | — |

C denotes Comparative
I denotes Invention
*According to JP2015017177

The results of table 3 show that, for a BACT molar fraction of 20 (not indicated in the table) to 70 mol % (preferably 25 to 60 mol %), the melting point is below 290° C. (preferably below 280° C.). At the same time, the Tg is very high and can be modulated from 125° C. (not indicated in the table) to approximately 165° C. The heat of crystallization for all these products is particularly high, and in particular greater than 50 J/g (in particular greater than the MXDT/10T described in WO 2014/064375).

TABLE IV

| Ref | 10T mol % | BACT mol % | 11 mol % | Mp ° C. | Tc ° C. | Mp – Tc ° C. | DeltaHc J/g | Tg ° C. | Inherent viscosity |
|---|---|---|---|---|---|---|---|---|---|
| I8 | 41.5 | 50.8 | 7.7 | 269.2 | 232.4 | 36.8 | 41.4 | 149.5 | 1.14 |
| I9 | 38.2 | 46.9 | 14.9 | 256.1 | 189.7 | 66.4 | 28.7 | 144.9 | 1.22 |

The partial replacement of one of the two units with 11-aminoundecanoic acid is also possible and gives good results for obtaining a good Mp/Tg compromise (table IV).

TABLE V

| Ref | 10T mol % | BACT mol % | 6T mol % | Mp ° C. | Tc ° C. | Mp – Tc ° C. | DeltaHc J/g | Tg ° C. | Inherent viscosity |
|---|---|---|---|---|---|---|---|---|---|
| I10 | 42.5 | 51.9 | 5.5 | 270.9 | 234.0 | 36.9 | 49.7 | 161.3 | 1.02 |
| I11 | 40.5 | 49.5 | 10 | 263.9 | 233.2 | 30.7 | 44.5 | 143.2 | 0.86 |

The partial replacement of one of the two units with the 6T unit is also possible and gives good results for obtaining a good Mp/Tg compromise (table V).

TABLE VI

| Ref. | Test type | Molecular structure/ Molar composition | Mp ° C. | Tc ° C. | Mp – Tc ° C. | DeltaHc J/g | g ° C. | Inherent viscosity |
|---|---|---|---|---|---|---|---|---|
| C1 | Comparative (EP1988113) | 10T/6T (59/41) | 281 | 236 | 45 | 44 | 122 | 1.12 |
| C2 | Comparative (EP1988113) | 10T/6T/11 (60/24/16) | 269 | 220 | 49 | 39 | 111 | 1.25 |
| C3 | Comparative (WO2011/00393) | 10T/TMDT (59/41) | 263 | 197 | 66 | 35 | 133 | 1.15 |
| C10T | Comparative | 10T (100) | 314 | 279 | 35 | 63 | 120 | insoluble |
| C4 | Comparative | 10T/11 (67/33) | 269 | 232 | 37 | 50 | 84 | 1.19 |
| C5 | Comparative | 10,T/11 (59/41) | 261 | 213 | 46 | 39 | 78 | 1.15 |
| C6 | Comparative | 10T/10I (67/33) | 269 | 205 | 64 | 32 | 110 | 1.12 |
| C7 | Comparative | MXDT/11 (59/41) | 211 | (*) | >100 | 12 | 111 | 1.25 |
| C8 | Comparative | MPMDT/11 (59/41) | — | (*) | — | — | 84 | 1.14 |
| C9 | Comparative (WO2014/064375) | 10T/MXDT (50/50) | 262 | 211 | 51 | 17 | 137 | 0.99 |
| C10 | Comparative (WO2014/064375) | 10T/MPMDT (59/41) | 264 | 219 | 45 | 40 | 126 | 1.11 |
| C11 | Comparative | 10T/MPMDT (50/50) | 245 | 185 | 60 | 22 | 127 | 1.12 |
| C12 | Comparative (WO2014/064375) | 10T/12T/11 (60/24/16) | 271 | 246 | 25 | 56 | 105 | 0.98 |
| C13 | Comparative (WO2014/064375) | 18T/MXDT (71/29) | 264 | 242 | 22 | 47 | 95 | 0.86 |

(*): No crystallization on cooling.

B—Preparation of a Polyamide Polymer by Chain Extension of a Reactive Prepolymer (or Oligomer)

B-1 Preparation of Reactive Prevolymers of P(X')n (or P(Y')n) Type

The following procedure is an example of a preparation process, and is not limiting. It is representative of all the compositions according to the invention:

5 kg of the following starting materials are introduced into a 14-liter autoclave reactor:
 500 g of water,
 the diamines,
 the amino acid (optionally),
 the terephthalic acid and optionally one or more other diacid(s),
 35 g of sodium hypophosphite in solution,
 0.1 g of a Wacker AK1000 antifoaming agent (Wacker Silicones).

The closed reactor is purged of its residual oxygen and then heated to a temperature of 230° C. of the material. After stirring for 30 minutes under these conditions, the pressurized vapor which has formed in the reactor is gradually reduced in pressure over 60 minutes, while gradually increasing the internal temperature so that it becomes established at Mp+10° C. at atmospheric pressure. The oligomer (prepolymer) is subsequently emptied out via the bottom valve, then cooled in a water trough and then ground.

The natures and molar ratios of the molecular structures and units of the polyamides (by referenced test) are given in table VII below. They were obtained using 1,3-BAC having a cis/trans ratio of 75/25 mol %.

TABLE VII

| Ref. | Molecular structure and chemical composition (mol %) | Mp ° C. | Tc ° C. | Mp – Tc ° C. | DeltaHc J/g | Tg ° C. | Inherent viscosity — | Acid number meq/kg* | Amine number meq/kg* | Mn** g/mol |
|---|---|---|---|---|---|---|---|---|---|---|
| P1 | 1,3-BACT/10T (40/60) | 259.2 | 217 | | 45.0 | 121.0 | 0.35 | 713 | 56 | 2601 |
| P2 | 1,3-BACT/10T (40/60) | 265.7 | 230.6 | | 58.6 | 104.6 | 0.42 | 0 | 639 | 3129 |

*Milliequivalents per kilogram
**Potentiometric Mn

B-2 Preparation of the Polyamide Polymer by Reaction Between Prepolymer P(X')n and P(Y')n A stoichiometric mixture (mol(acid)=(mol(amine)) of the two oligomers P1 (X'=COOH) and P2 (Y'=NH$_2$) above, dried and ground, is introduced with nitrogen flushing into a DSM co-rotating conical screw microextruder (15 ml in volume) preheated to 280° C. with screw rotation at 100 rpm. The mixture is left to recirculate in the microextruder and the increase in the viscosity is monitored by measuring the normal force. After approximately 15 minutes, the contents of the microextruder are emptied out in the form of a rod. The air-cooled product is granulated.

The product 112 obtained has an inherent viscosity equal to 1.92.

B-3 Preparation of the Polyamide Polymer by Reaction Between Prepolymer P(X')n and an Extender Y-A'-Y 10 g of the dried and ground oligomer P1 above are mixed with a stoichiometric amount of 1,3-phenylenebisoxazoline (PBO). The mixture is introduced under nitrogen flushing into a DSM corotating conical-screw microextruder (15 ml in volume) preheated to 280° C. with rotation of the screws at 100 rev/min. The mixture is left to recirculate in the microextruder and the increase in the viscosity is monitored by measuring the normal force. After approximately 2 minutes, a plateau is reached and the contents of the microextruder are emptied out in the form of a rod. The air-cooled product is granulated.

The product 113 obtained has an inherent viscosity equal to 0.97.

What is claimed is:

1. A composition suitable for a thermoplastic composite material comprising:
    30% to 60% by volume of a non-reactive thermoplastic matrix comprising from 50% to 100% by weight of a semi-crystalline polyamide polymer and from 0% to 50% by weight of at least one additive and/or of at least one other polymer,
    40% to 70% by volume of long reinforcing fibers, wherein the long reinforcing fibers have a circular cross-section with L/D >1000, said thermoplastic matrix impregnates said long reinforcing fibers, said semi-crystalline polyamide polymer comprises at least one BACT/XT copolyamide in which:
    BACT is a unit comprising an amide unit present at a molar content ranging from 20% to 70%, wherein BAC is chosen from 1,3-bis(aminomethyl)cyclohexyl (1,3-BAC), 1,4-bis(aminomethyl)cyclohexyl (1,4-BAC) and a mixture thereof, and T is terephthalic acid,
    XT is a unit comprising an amide unit present at a molar content ranging from 30% to 80%, wherein X is a C9 to C18 linear aliphatic diamine, and wherein T is terephthalic acid,
    in the BACT and/or XT units, independently of one another, up to 30 mol % relative to the total amount of dicarboxylic acids, of the terephthalic acid can be replaced with other aromatic, aliphatic or cycloaliphatic dicarboxylic acids comprising 6 to 36 carbon atoms, and
    in the BACT and/or XT units, independently of one another, up to 30 mol % of the BAC and/or where appropriate of X, relative to the total amount of diamines, can be replaced with other diamines comprising from 4 to 36 carbon atoms, and
    in the copolyamide, no more than 30 mol %, relative to the total amount of monomers, can be formed by lactams or aminocarboxylic acids, and
    wherein the sum of the monomers which replace the terephthalic acid, the BAC and X does not exceed a concentration of 30 mol %, relative to the total amount of monomers used in the copolyamide, and
    on condition that BACT and XT units are always present in said polyamide polymer.

2. The composition of claim 1, wherein said semi-crystalline polyamide polymer has a melting point Mp<290° C., as determined according to the standard ISO 11357-3 (2013).

3. The composition of claim 1, wherein said semi-crystalline polyamide polymer has a glass transition temperature Tg >120° C., determined according to the standard ISO 11357-2 (2013).

4. The composition of claim 1, wherein said semi-crystalline polyamide polymer exhibits a difference between the melting point and the crystallization temperature Mp-Tc<40° C., determined according to the standard ISO 11357-3:2013.

5. The composition of claim 1, wherein the heat of crystallization of the semi-crystalline polyamide polymer, measured by differential scanning calorimetry (DSC) according to the standard ISO 11357-3:2013, is greater than 40 J/g.

6. The composition of claim 1, wherein the BAC is 1,3-BAC.

7. The composition of claim 1, wherein the BAC is 1,3-BAC, and XT is chosen from 9T, 10T, 11T and 12T.

8. The composition of claim 1, wherein the XT is 10T, wherein 10 corresponds to 1,10-decanediamine.

9. The composition of claim 1, wherein the sum of the monomers which replace the terephthalic acid, the BAC and X is equal to 0.

10. A mechanical or structural part comprising the thermoplastic composite material of claim 1.

11. The mechanical or structural part of claim 10, wherein said part is an part in an application selected from the group consisting of a motor vehicle, a railway, a marine craft, a wind power generator, a photovoltaic collector, a solar energy application, a solar panel, a solar power station, sports equipment, an aeronautical or aerospace application, a transportation application, building and construction, a civil engineering structure, a panel, and a leisure application.

12. The mechanical or structural part of claim 11, wherein said motor vehicle part is post-treated by cataphoresis.

13. The mechanical or structural part of claim 11, wherein said part is an element in a wind power application.

14. The mechanical or structural part of claim 11, wherein said part is an element in an aeronautical structure.

* * * * *